United States Patent
Shamasundar

(12) 
(10) Patent No.: US 10,710,743 B1
(45) Date of Patent: Jul. 14, 2020

(54) LANDING LIGHT SYSTEM FOR AIRCRAFT

(71) Applicant: HONEYWELL INTERNATIONAL INC., Morris Plains, NJ (US)

(72) Inventor: Raghu Shamasundar, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 4 days.

(21) Appl. No.: 16/241,022

(22) Filed: Jan. 7, 2019

(51) Int. Cl.
| | | |
|---|---|---|
| *B64D 47/04* | (2006.01) | |
| *B64F 1/00* | (2006.01) | |
| *G08G 5/06* | (2006.01) | |
| *F21W 107/30* | (2018.01) | |
| *F21W 103/60* | (2018.01) | |

(52) U.S. Cl.
CPC ............. *B64F 1/002* (2013.01); *G08G 5/065* (2013.01); *F21W 2103/60* (2018.01); *F21W 2107/30* (2018.01)

(58) Field of Classification Search
None
See application file for complete search history.

(56) References Cited

U.S. PATENT DOCUMENTS

| | | | | |
|---|---|---|---|---|
| 2,777,049 A | * | 1/1957 | Clark ....................... | B64F 1/20 362/285 |
| 3,191,146 A | * | 6/1965 | Mitchell ................... | B64F 1/20 340/955 |
| 4,677,753 A | * | 7/1987 | Loggers ................... | B60Q 1/52 33/264 |
| 7,080,928 B2 | | 7/2006 | Barnhart et al. | |
| 9,567,102 B1 | * | 2/2017 | Ross ....................... | B64D 45/00 |
| 9,769,440 B2 | * | 9/2017 | Nahmiyace .......... | H04N 9/3161 |
| 9,856,035 B1 | * | 1/2018 | Keller .................... | F21S 41/657 |
| 2004/0026573 A1 | * | 2/2004 | Andersson ................ | B64F 1/20 244/183 |
| 2005/0040970 A1 | * | 2/2005 | Hutchins .......... | G08G 1/096716 340/907 |
| 2008/0137353 A1 | | 6/2008 | Larsen et al. | |
| 2012/0133283 A1 | | 5/2012 | Everett et al. | |

(Continued)

FOREIGN PATENT DOCUMENTS

EP        2857262 A1     4/2015

OTHER PUBLICATIONS

Mercedes-Benz Digital Light Headlights Display Messages on Road | Digital Trends; Retrieved from Internet [[https://www.digitaltrends.com/cars/mercedes-benz-digital-light/ Jan. 7, 2019]].

*Primary Examiner* — John F Mortell
(74) *Attorney, Agent, or Firm* — Lorenz & Kopf, LLP

(57) ABSTRACT

Enhanced landing light systems and methods are provided. The system determines that landing lights in a landing lights assembly are on and then proceeds to identify each of the following relevant contexts: landing, taxi, and takeoff. When the aircraft is in a relevant context, the system identifies an actual travelpath and determines whether the actual travelpath matches the intended travelpath. If it does, the system generates guidance information and begins projecting the guidance information onto a landing surface. The guidance information may be digital light and comprise alphanumeric information and symbology. When the actual travelpath does not match the intended travelpath, the system generates a guidance alert and begins projecting the guidance alert onto the landing surface.

20 Claims, 5 Drawing Sheets

(56) References Cited

U.S. PATENT DOCUMENTS

2015/0146442 A1    5/2015   Bonnefous et al.
2017/0073083 A1*   3/2017   Hessling-von Heimendahl ..........
                                           F21S 41/255

* cited by examiner

LANDING LIGHT SYSTEM FOR AIRCRAFT

TECHNICAL FIELD

The technical field generally relates to landing light systems, and more particularly relates to systems and methods that provide aircraft guidance with projected light from landing light systems.

BACKGROUND

Landing light systems are mounted on aircraft and are primarily used to illuminate the terrain, traffic and runway ahead of the aircraft during takeoff and landing. Conventional landing light systems have one or more landing lights, variously arranged on an aircraft. The landing lights project a beam of light along an axis, and the landing light systems may variously configure the one or more landing lights to illuminate terrain ahead. Two common landing light configurations include an external and a wing-rooted configuration. Many conventional aircraft use wing-rooted landing light systems. In a wing-rooted landing light system, landing lights are extended out of a clean aerodynamic surface of the wing during operation and retracted when they are not in operation.

As may be appreciated, landing light systems are primarily useful during the night; and, in certain scenarios, it is mandatory to use them during night operations. Used at night, landing lights enhance the crew's night vision and contribute to an overall safety net for the aircraft. Due to the brightness of landing lights, landing light systems may also be used for functions like increasing the visibility of an aircraft to other pilots, and to act as a means of collision risk mitigation in a crowded airspace. As aircraft design evolves, there is a desire to provide expanded landing light functionality, for example, to provide guidance information.

Accordingly, landing light systems and methods that provide expanded functionality are desirable. The desirable technologically improved landing light system provides aircraft guidance information though an integration of internal and external systems with improved landing light technologies. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An embodiment of a landing light system for an aircraft is provided. The system includes: a source of airport features data; a source of navigation data; a source of an intended travelpath; a source of aircraft state data; a source of air traffic control commands; a landing lights assembly configured to project light; and a control module including a processor and a memory programmed with a landing lights program, the control module operationally coupled to the source of airport features data, the source of navigation data, the source of the flight plan, the source of aircraft state data, and the source of air traffic control commands, the control module configured to execute the landing lights program to: determine that landing lights in the landing lights assembly are on; identify each of the following relevant contexts: landing, taxi, and takeoff; and when in a relevant context, identify an actual travelpath; determine whether the actual travelpath matches the intended travelpath; when the actual travelpath matches the intended travelpath, generate guidance information and begin projecting the guidance information onto a landing surface; and when the actual travelpath does not match the intended travelpath, generate a guidance alert and begin projecting the guidance alert onto the landing surface.

A method for landing lights for an aircraft is provided. The method includes: at a processor communicatively coupled to a memory programmed with a landing lights program, executing the landing lights program to perform the operations of: determining that landing lights in the landing lights assembly are on; identifying each of the following relevant contexts: landing, taxi, and takeoff; and identifying an actual travelpath when in a relevant context; determining whether the actual travelpath matches the intended travelpath; and wherein projecting guidance information includes controlling a digital light in a landing lights system, when the actual travelpath matches the intended travelpath, generating guidance information and beginning to project the guidance information onto a landing surface; and when the actual travelpath does not match the intended travelpath, generating a guidance alert and beginning to project the guidance alert onto the landing surface.

An aircraft, including: a source of airport features data; a source of navigation data; a source of an intended travelpath; a source of aircraft state data; a source of air traffic control commands; a landing lights assembly configured to project digital light; and a landing light system for an aircraft, including a processor and a memory programmed with a landing lights program, the control module operationally coupled to the source of airport features data, the source of navigation data, the source of the flight plan, the source of aircraft state data, and the source of air traffic control commands, the control module configured to execute the landing lights program to: determine that landing lights in the landing lights assembly are on; identify each of the following relevant contexts: landing, taxi, and takeoff; and identify an actual travelpath when in a relevant context; determine whether the actual travelpath in the relevant context matches the intended travelpath; when the actual travelpath matches the intended travelpath, generate guidance information and begin commanding the landing lights assembly to project the guidance information onto a landing surface; and when the actual travelpath does not match the intended travelpath, generate a guidance alert and begin commanding the landing lights assembly to project the guidance alert onto the landing surface.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, conventional landing light systems are generally used for night illumination, increasing the visibility of an aircraft to other pilots, and as a means of collision risk mitigation in a crowded airspace. However, as aircraft design evolves, there is a commensurate technological need for landing light systems that utilize more sophisticated light types and that provide improved performance, beyond what is offered by conventional landing light systems.

The provided landing light system (102, FIG. 1) provides solutions to these needs.

Exemplary embodiments of the provided landing light system 102 improves upon conventional landing light systems by generating and projecting guidance information.

Embodiments of the landing light system 102 utilize advanced light technologies, such as digital lights, and control the projected light to thereby provide guidance information and alerts. The guidance information and alerts may be projected by the landing lights system 102 onto a surface, such as a taxiway or runway. In various embodiments, the projected guidance information and alerts are in the form of alphanumeric information and/or symbology. In some embodiments, the light technology utilized is one or more high precision digital lights, and the guidance information and alerts are projected digital light. With this novel technique, light guidance can be projected in real time and concurrent with the illuminating light that supports night vision, as well as the illuminating light that increases visibility of an aircraft to other pilots. The provided systems and methods may be particularly useful during the takeoff and landing phase of the flight.

Figure 1:
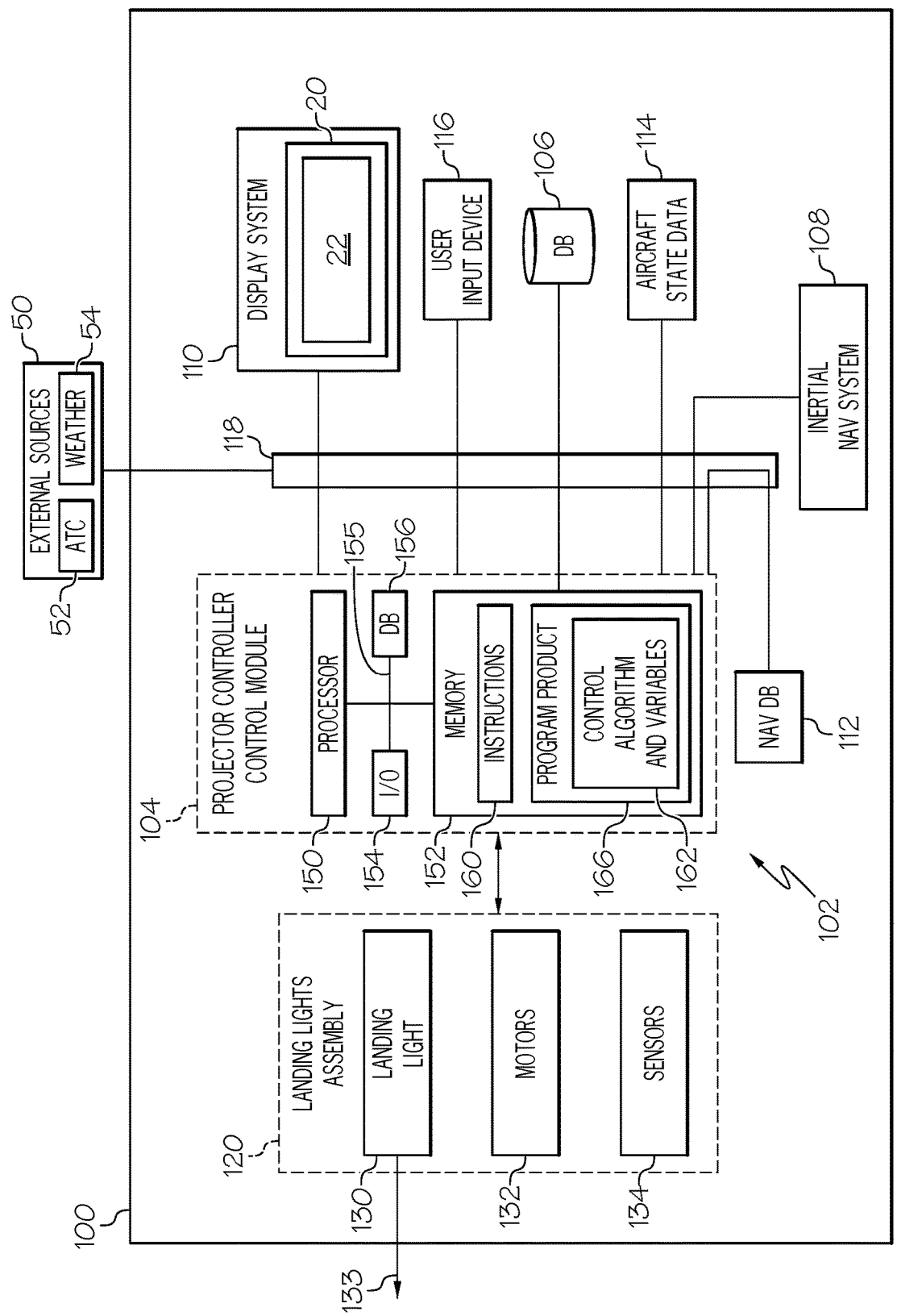
FIG. 1 is a block diagram of a landing light system, in accordance with an exemplary embodiment.

Turning now to FIG. 1, in an embodiment, the landing light system 102 (also referred to herein as "system" 102) is generally associated with a mobile platform 100. In various embodiments, the mobile platform 100 is an aircraft, and is referred to as aircraft 100. The system 102 embodies a controller or control module, represented as control module 104. In some embodiments, the control module 104 is integrated within a preexisting mobile platform management system, avionics system, cockpit display system (CDS), flight controls system (FCS), or aircraft flight management system (FMS). Although the control module 104 is shown as an independent functional block, onboard the aircraft 100, in other embodiments, it may exist in an electronic flight bag (EFB) or portable electronic device (PED), such as a tablet, cellular phone, or the like. In embodiments in which the control module is within an EFB or a PED, a display system 110 and a user input device 116 may also be part of the EFB or PED.

The control module 104 may be in operable communication with any combination of the following on-board systems: a source of airport and runway features data, such as database 106; a source of navigation data, such as inertial navigation system 108; a source of an intended flight plan or travelpath, such as a navigation database 112; a source of aircraft state data 114; a source of air traffic control commands 52; and, a landing lights assembly 120. In various embodiments, communication between the on-board systems and the control module 104 is via a communication system and fabric 118. In some embodiments, the control module 104 is also in operable communication with the user input device 116 and display system 110. The functions of these aircraft systems, and their interaction, are described in more detail below.

For simplicity, the landing lights assembly 120 may be shortened to lights assembly 120. Broadly, the lights assembly 120 may be described as follows. The lights assembly 120 comprises at least one landing light (also referred to herein as "LL" 130). Responsive to controls, the LL 130 projects a beam of light 133 from a portion called a light head; the beam of light 133 extends outward along an axis from the light head and illuminates a spot or area on a surface of which the beam of light 133 impinges. In various embodiments, the lights assembly 120 also comprises one or more motors 132 for controlling the movement and orientation of the one or more LL 130 (as used herein, the orientation of the LL 130 refers to the orientation and direction of projection of the beam from the LL light head with respect to earth). The lights assembly 120 may include sensors 134 to detect light type, orientation, and configuration status of the LL 130 and convert this status information into electrical signals for processing. The lights assembly 120 may also determine a predicted distance or range from the LL 130 to a desired spot or point of interest (POI).

In various embodiments, each instance of a LL 130 is a high precision digital light, including an arrangement of reflectors associated therewith. In these embodiments, the referred to "beam of light" may be a pattern of reflected light that has been generated, the pattern having a cross section centered around the axis extending outward from the light head. The resulting illuminated area may comprise the entirety of a symbol or alphanumeric message on a surface of which the beam of light 133 impinges.

In some embodiments, real-time aircraft navigation data is generated by the aircraft inertial navigation system 106. Real-time aircraft navigation data may include any of: an instantaneous location (e.g., the latitude, longitude, orientation), an instantaneous heading (i.e., the direction the aircraft is traveling in relative to some reference), a flight path angle, a vertical speed, a ground speed, an instantaneous altitude (or height above ground level), and a current phase of flight of the aircraft 100. As used herein, "real-time" is interchangeable with current and instantaneous. The aircraft inertial navigation system 106 may be realized as including a satellite navigation system (GNSS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. The real-time aircraft navigation data is made available, generally by way of the communication system and fabric 118, so other components, such as the control module 104 and the display system 110, may further process and/or handle the aircraft navigation data.

The aircraft inertial navigation system 108 may provide an active trajectory that includes a series of intended geospatial midpoints between a departure and an arrival, as well as performance data associated with each of the geospatial midpoints (non-limiting examples of the performance data include intended navigation data, such as: intended airspeed, intended altitude, intended acceleration, intended flight path angle, and the like). As such, an active trajectory may be part of an operational flight plan (OFP). The aircraft inertial navigation system 108 may include a storage location, such as a navigation database, that may also maintain flight plans, and/or information regarding terrain and airports and/or other potential landing locations including runway information (or destinations) for the aircraft 100.

In various embodiments, the communications system and fabric 118 is configured to support instantaneous (i.e., real time or current) communications between on-board systems, the control module 104, and one or more external data source(s). The communications system and fabric 118 may incorporate one or more transmitters, receivers, and the supporting communications hardware and software required for components of the system 102 to communicate as described herein. In various embodiments, the communications system and fabric 118 may have additional communications not directly relied upon herein, such as bidirectional pilot-to-ATC (air traffic control) communications via a datalink, and any other suitable radio communication system that supports communications between the aircraft 100 and various external source(s).

The user input device 116 and the control module 104 are cooperatively configured to allow a user (e.g., a pilot, co-pilot, or crew member) to interact with display devices 20 in the display system 110 and/or other elements of the system 102, as described in greater detail below. Depending on the embodiment, the user input device 116 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 116 is configured as a touchpad or touchscreen, it may be integrated with the display system 110. As used herein, the user input device 116 may be used by a pilot to communicate with external sources, to modify or upload the program product 166, etc. In various embodiments, the display system 110 and user input device 116 are onboard the aircraft 100 and are also operationally coupled to the communication system and fabric 118. In some embodiments, the control module 104, user input device 116, and display system 110 are configured as a control display unit (CDU).

In various embodiments, the control module 104, alone, or as part of a central management computer (CMS) or a flight management system (FMS), draws upon data and information from the aircraft inertial navigation system 108, navigation database 112, airport features database, such as database 106, and lights assembly 120 to provide real-time flight guidance for aircraft 100. The real-time flight guidance may be provided to a user by way of alphanumeric information, symbology, images, and alerts projected as digital light on a surface with predicted distance, such as a taxiway or runway.

To interact with the user, the control module 104 may perform display processing, generate display commands for the display system 110 and thereby cause the display device 20 to render thereon images 22 including various graphical user interface elements, tables, icons, alerts, menus, buttons, and pictorial images, as required for interaction. The display system 110 may be configured to continuously receive and process the display commands from the control module 104 and present information on the display device 20. In exemplary embodiments, the display device 20 is realized on one or more electronic display devices, such as a multi-function display (MFD) or a multi-function control display unit (MCDU), or Electronic Fligt Bag (EFB) display configured as any combination of: a head up display (HUD), an alphanumeric display, a vertical situation display (VSD) and a lateral navigation display (ND).

In various embodiments, the aircraft inertial navigation system 108 includes, or is integrated with, one or more databases 106 that provide terrain and airport feature data having therein topographical information for an airport and surrounding environment. Therefore, databases in the aircraft inertial navigation system 108 may include one or more of: a runway awareness and advisory system (RAAS) database and an Aerodrome Mapping Database (AMDB).

In various embodiments, the databases have therein maps and geometries, including runway records with corresponding runway threshold locations. The AMDB may also include airport status data for the runways and/or taxi paths at the airport; the airport status data indicating operational status and directional information for the taxi paths (or portions thereof).

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, the embodiment of the control module 104 depicted in FIG. 1 comprises a processor 150 in communication with a memory 152. The memory 152 stores instructions and applications 160 which direct the general operation of the control module 104 and the system 102. The memory 152 specifically stores a landing lights program 162 (simplified to program 162), which includes one or more programs, algorithms and rules embodied as instructions and applications that, when executed by the processor 150, cause the control module 104 to perform the method steps and operations attributed to the system 102, as described herein. During operation, the processor 150 loads and executes the program 162.

The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. The memory 152 stores instructions and applications 160 and program 162. Information stored in the memory 152 may be organized and/or imported from an external source during an initialization step of a process; it may also be programmed via a user input device 116.

The novel program 162 directs the performance of the system 102 tasks described hereinbelow. Novel program 162 and associated stored variables 164 may be stored in a functional form on computer readable media, for example, as depicted, in memory 152. While the depicted exemplary embodiment of the control module 104 is described in the context of a fully functioning computer system, those skilled in the art will recognize that the mechanisms of the present disclosure are capable of being distributed as a program product 166.

As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 152 and as program product time-based viewing of clearance requests in certain embodiments.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 118. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 118 and obtains data from external data source(s) directly. Also, in various embodiments, the I/O interface 154 may support communication with technicians, and/or one or more storage interfaces for direct connection to storage apparatuses, such as the database 156.

In some embodiments, the database 156 is part of the memory 152. In various embodiments, the database 156 is integrated, either within the control module 104 or external to it. Accordingly, in some embodiments, the airport features data and terrain features are pre-loaded and internal to the control module 104. In executing the below described tasks and functions, the processor 150 specifically loads the instructions embodied in the landing lights program 162, thereby being programmed with program 162.

In an embodiment of a landing light system 102 for an aircraft 100, the control module 104 is configured to execute the landing lights program 162 to thereby perform a series of operations as follows. The control module 104 may first determine whether one or more landing lights LL 130 in the landing lights assembly are on, and when they are on, to determine why they are on, which is referred to herein as identifying a context. In an embodiment, the control module 104 monitors a current location of the aircraft and its phase of flight and determines the context as a function of at least the current location and phase of flight. The control module 104 may determine if the context is relevant, as defined by the rules in the landing lights program 162. As used herein, if the context is relevant, that means the landing lights should be on during this time or operation. In an embodiment, the control module 104 can identify each of the following relevant contexts: landing, taxi, and takeoff. In other embodiments, a user can create one or more additional or different predefined relevant contexts, and the control module 104 references the one or more additional or different predefined relevant contexts to identify when the aircraft 100 is in a relevant context. At any given time, the control module 104 determines if it is in a relevant context, and when it is, which relevant context it is in.

When the aircraft 100 is in a relevant context, the control module 104 may identify an actual travelpath and determines whether the actual travelpath matches an intended travelpath. The intended travelpath may be referenced from the navigation database 112. When the actual travelpath matches the intended travelpath within a preprogrammed margin, the control module 104 generates guidance information and the control module 104 begins projecting the guidance information onto a landing surface. When the actual travelpath does not match the intended travelpath, a guidance alert is generated and the control module 104 begins projecting the guidance alert onto the landing surface. In various embodiments, the landing surface is a runway, a taxiway, or a gate. When it is stated that the control module 104 is configured to "generate and project" the guidance information, this incorporates the steps of commanding one or more motors 132 to cause one or more LLs 130 to project light in the form of the herein described guidance information. When the one or more LLs 130 are digital lights, the control module "generates and projects" the guidance information by commanding the landing lights assembly (via the one or more motors 132) to cause one or more LLs 130 (which may include an associated arrangement of reflectors) to project digital light in the shapes, symbols and forms of the herein described guidance information. When the control module 104 determines that the aircraft 100 is no longer in a relevant context, it may cease generation and projection of guidance information and guidance alerts that were generated in relation to a previously identified relevant context.

When the relevant context is landing, the control module 104 generates guidance information including an alphanumeric runway identification, which includes referencing a runway database or airport features database (for example, DB 106). The control module 104 is configured to determine a remaining runway length and project an alphanumeric indicator and symbology indicating the remaining runway length and illuminate the light distance based on the remaining runway length.

When the relevant context is takeoff, the control module 104 is further configured to update the guidance information with remaining runway length as the aircraft 100 travels along the runway, and the updates are in accordance with a pre-programmed length increment. When the context is landing, the control module 104 is further configured to reference the database 106 and other inputs to identify an approved exit gate. After identifying the exit gate, the control module 104 generates guidance information including an alphanumeric gate identification and an alphanumeric indicator of a remaining distance to the approved exit gate. When the context is a taxi, the control module 104 is configured to identify an air traffic control (ATC) hold command, which includes respective instructions. After identifying the ATC hold command, the control module updates the guidance information with ATC hold command instructions.

FIGS. 2-5 provide examples of embodiments of the novel system 102 in operation. In the described examples, the one or more landing lights LL 130 are high precision digital lights, emitting digital light when they are "on" and ceasing to emit when they are "off." In some embodiments, the high precision digital lights include an assembly, such as an array, of reflectors therewith. One or more of the LL 130 are arranged on the aircraft 100 and configured such that the control module 104 may command the motors 132 to guide the one or more LLs 130 to project digital light in the form of symbology and alphanumeric information inclusive of the "guidance information" and "guidance alerts," described below.

Figure 2:
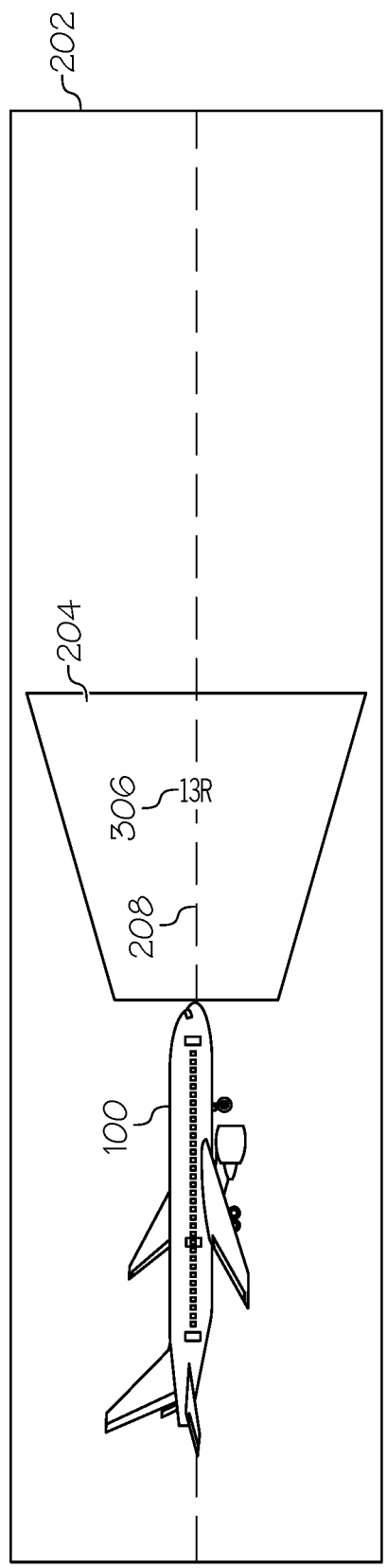
FIGS. 2-5 are illustrations depicting use cases for the landing light system, in accordance with an exemplary embodiment.

In FIG. 2, a first use case is presented, showing the projection of active runway information onto the runway during a takeoff. The system 102 determines the relevant context, or phase of flight, as being takeoff and obtains or otherwise determines the runway identification. The system projects guidance in the form of digital light (204, 206, 208) providing at least the runway identification. For example, the runway 202 identification is 13R. An outline 204 is projected that indicates the runway on which it is traveling. It is rendered to be visually distinguishable at night or in compromised lighting. Depicted on the outline of the runway are the runway identification 206 (rendering "13R") and a runway centerline 208. Each of the stated depictions is rendered on the runway surface in digital light, with a color and/or intensity that permits easy viewing. For example, the outline 204 may be rendered as wide as the actual runway 202, or it may be rendered to be tapered such that it is narrow near the nose of the aircraft 100 and grows wider farther from the nose of the aircraft, as shown in FIG. 2.

Figure 3:
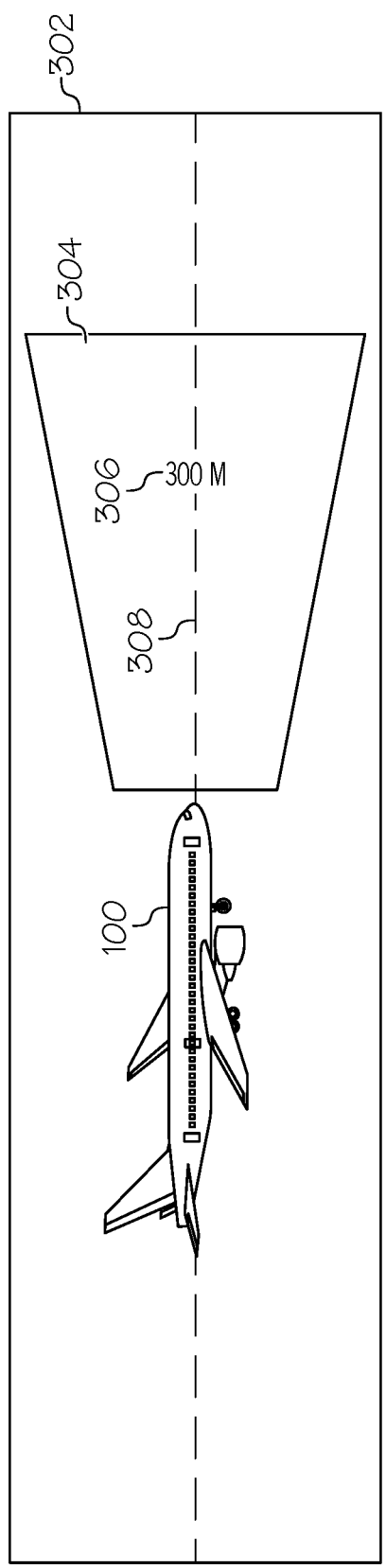

In FIG. 3, the relevant context is a rolling aircraft 100 on runway 13R. The system retrieves airport features data and determines a remaining amount of distance on runway 13R. The system projects guidance in the form of digital light (304, 306, 308) providing at least the remaining distance. the runway 202 identification is 13R. As before, an outline 304 is projected that indicates the runway. It is rendered to be visually distinguishable at night or in compromised lighting. Depicted on the outline 304 of the runway are the remaining distance 306 (rendering "300M") and a runway centerline 208. Each of the stated depictions is rendered in digital light, with a color and/or intensity that permits easy viewing.

Figure 4:
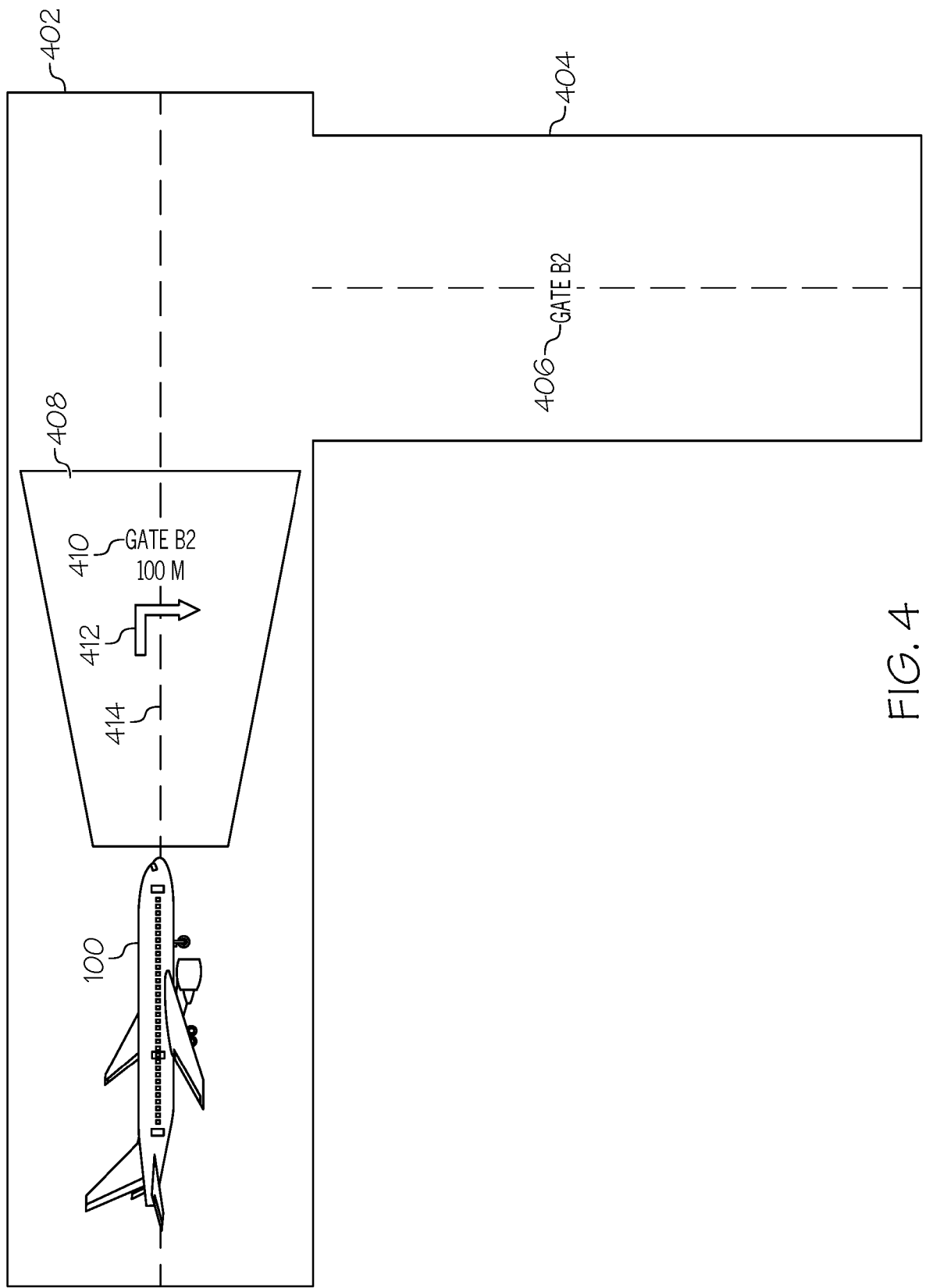

In FIG. 4, the relevant context is a rolling aircraft 100 that is looking for a taxi exit (404, 406) from the runway (402) that it is traveling on. The system 102 retrieves airport features data and determines a remaining amount of distance on the present runway 402 before the desired taxi exit 404. The system projects guidance in the form of digital light (408, 410, 412, 414) providing (at 410) at least the remaining distance to the desired taxi exit ("100M"), and the taxi exit identification (for example, "Gate B2" rendered on the present runway and on the exit (at 406). The system 102 may also project symbolism 412, such as an arrow, to indicate a direction of a turn at the desired exit (indicating that it will be to the right).

Figure 5:
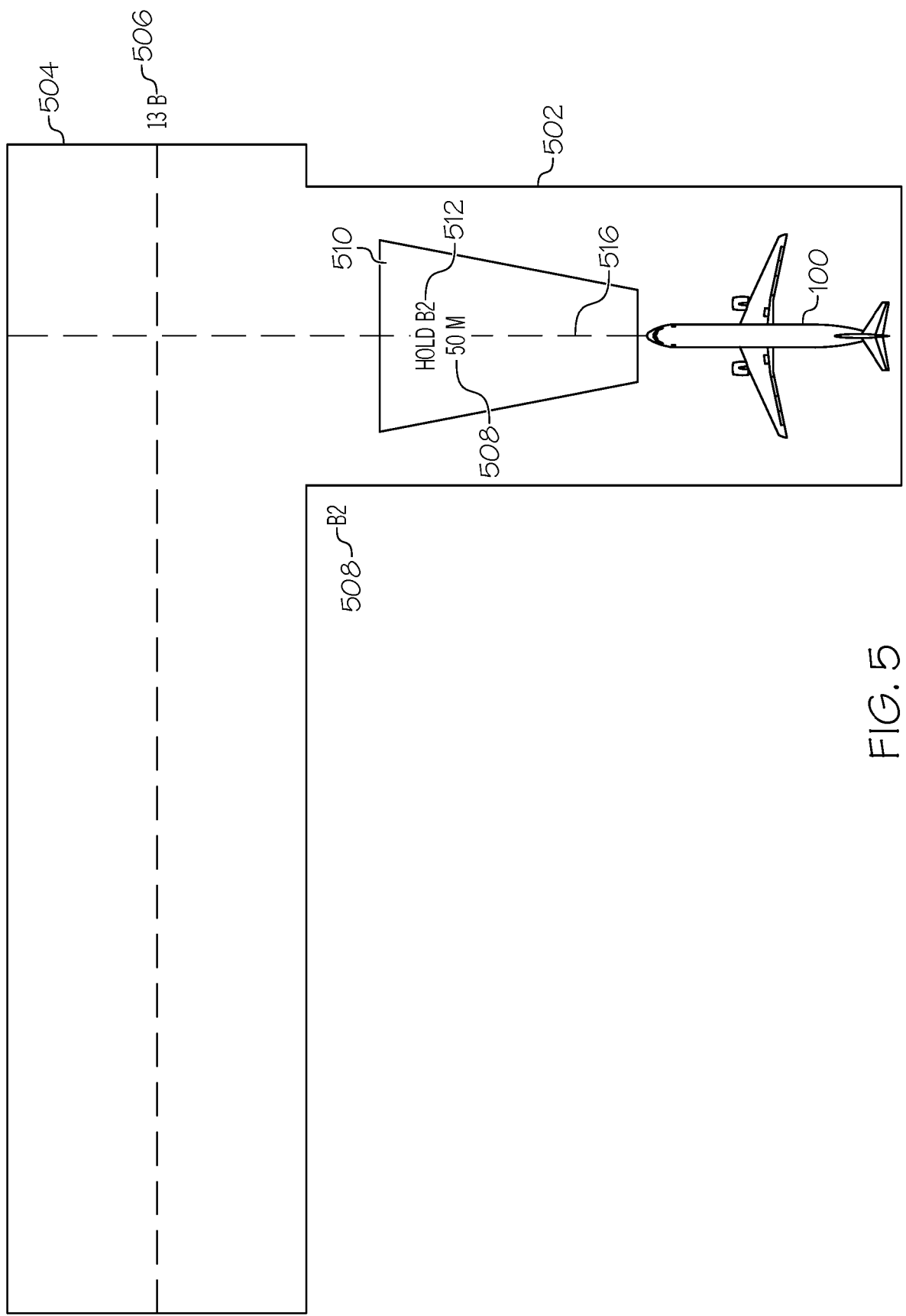

In FIG. 5, the relevant context is aircraft 100 is on a gateway 502, having gate identification B2 (at 508) and has received a HOLD on gate command from air traffic control (ATC) before it may proceed into runway 13R (runway 13R at 504, with identifier 506). The system 102 retrieves airport features data and determines a remaining amount of distance 514 for which the hold on gate command 512 applies. The system projects guidance in the form of digital light (510, 512, 514, 516) providing at least the remaining distance and the gate identification.

In various embodiments, the system 102 monitors a location of the aircraft 100 on a landing surface and ceases to generate and project guidance information upon determining that the context is no longer relevant.

Thus, the provided embodiments of a landing light system 102 and method are technologically improved at least in part in that they harness high precision light functionality to generate and project onto a surface symbology and alphanumeric information that provides aircraft guidance. In various embodiments, the projected guidance and alerts includes but is not limited to: an outline of a runway that the aircraft is currently on, a centerline of the runway that the aircraft is currently on, arrows, gate numbers, and the like.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A landing light system for an aircraft, comprising:
    a source of airport features data;
    a source of navigation data;
    a source of an intended travelpath;
    a source of aircraft state data;
    a source of air traffic control commands;
    a landing lights assembly configured to project light; and
    a control module comprising a processor and a memory programmed with a landing lights program, the control module operationally coupled to the source of airport features data, the source of navigation data, the source of the flight plan, the source of aircraft state data, and the source of air traffic control commands, the control module configured to execute the landing lights program to:
    determine that landing lights in the landing lights assembly are on;
    identify each of the following relevant contexts: landing, taxi, and takeoff; and
    when in a relevant context,
    identify an actual travelpath;
    determine whether the actual travelpath matches an intended travelpath;
    when the actual travelpath matches the intended travelpath, generate guidance information and begin projecting the guidance information onto a landing surface; and
    when the actual travelpath does not match the intended travelpath, generate a guidance alert and begin projecting the guidance alert onto the landing surface.

2. The landing light system of claim 1, wherein, when the relevant context is landing, the control module is further configured to:
    generate guidance information including an alphanumeric runway identification and an alphanumeric indicator and symbology of a remaining runway length.

3. The landing light system of claim 2, wherein, when the context is takeoff, the control module is further configured to:
    update the guidance information with remaining runway length in accordance with a pre-programmed length increment.

4. The landing light system of claim 3, wherein, when the context is landing, the control module is further configured to:
    identify an approved exit gate; and
    generate guidance information including an alphanumeric gate identification and an alphanumeric indicator of a remaining distance to the approved exit gate.

5. The landing light system of claim 4, wherein, when the context is taxi, the control module is further configured to:
    identify an ATC hold command; and
    update the guidance information with ATC hold command instructions.

6. The landing light system of claim 1, wherein guidance information and the guidance alert are digital light.

7. A method for landing lights for an aircraft, comprising:
    at a processor communicatively coupled to a memory programmed with a landing lights program,
    executing the landing lights program to perform the operations of:
    determining that landing lights in the landing lights assembly are on;
    identifying each of the following relevant contexts: landing, taxi, and takeoff;
    and identifying an actual travelpath when in a relevant context;
    determining whether the actual travelpath matches an intended travelpath; and wherein projecting guidance information includes controlling a digital light in a landing lights system, when the actual travelpath matches the intended travelpath, generating guidance information and beginning to project the guidance information onto a landing surface; and when the actual travelpath does not match the intended travelpath, generating a guidance alert and beginning to project the guidance alert onto the landing surface.

8. The method of claim 7, wherein, when the context is landing, the processor further performs the step of:

generating guidance information including an alphanumeric runway identification and an alphanumeric indicator and symbology of a remaining runway length.

9. The method of claim 8, wherein, when the context is takeoff the processor further performs the step of:

updating the guidance information with remaining runway length in accordance with a pre-programmed length increment.

10. The method of claim 9, wherein, when the context is landing, the processor further performs the step of:

identifying an approved exit gate; and generate guidance information including an alphanumeric gate identification and an alphanumeric indicator of a remaining distance to the approved exit gate.

11. The method of claim 10, wherein, when the context is taxi, the processor further performs the step of:

identifying an air traffic control (ATC) hold command; and update the guidance information with ATC hold command instructions.

12. The method of claim 11, wherein guidance information and the guidance alert are digital light.

13. An aircraft, comprising:

a source of airport features data;

a source of navigation data;

a source of an intended travelpath;

a source of aircraft state data;

a source of air traffic control commands;

a landing lights assembly configured to project digital light; and a landing light system for an aircraft, comprising a processor and a memory programmed with a landing lights program, the control module operationally coupled to the source of airport features data, the source of navigation data, the source of the flight plan, the source of aircraft state data, and the source of air traffic control commands, the control module configured to execute the landing lights program to:

determine that landing lights in the landing lights assembly are on;

identify each of the following relevant contexts: landing, taxi, and takeoff; and identify an actual travelpath when in a relevant context;

determine whether the actual travelpath in the relevant context matches an intended travelpath;

when the actual travelpath matches the intended travelpath, generate guidance information and begin commanding the landing lights assembly to project the guidance information onto a landing surface; and when the actual travelpath does not match the intended travelpath, generate a guidance alert and begin commanding the landing lights assembly to project the guidance alert onto the landing surface.

14. The aircraft of claim 13, wherein, when the context is landing, the landing lights system is further configured to:

generate guidance information including an alphanumeric runway identification and an alphanumeric indicator and symbology of a remaining runway length.

15. The aircraft of claim 13, wherein, when the context is landing, the landing lights system is further configured to:

update the guidance information with remaining runway length in accordance with a pre-programmed length increment.

16. The aircraft of claim 13, wherein, when the context is landing, the landing lights system is further configured to:

identify an approved exit gate; and generate guidance information including an alphanumeric gate identification and an alphanumeric indicator of a remaining distance to the approved exit gate.

17. The aircraft of claim 13, wherein, when the context is taxi, the landing lights system is further configured to:

identify an air traffic control (ATC) hold command; and update the guidance information with ATC hold command instructions.

18. The aircraft of claim 13, wherein, when the context is taxi, the landing lights system is further configured to render an outline of a runway that the aircraft is currently on.

19. The aircraft of claim 18, wherein the landing lights system is further configured to render a centerline of the runway that the aircraft is currently on.

20. The aircraft of claim 18, wherein the landing lights system is further configured to cease projection of guidance information in response to determining that the context is no longer relevant.

* * * * *